May 20, 1958
C. G. WATSON
2,835,783
TUBE WELDING MACHINE
Filed Aug. 31, 1954
3 Sheets-Sheet 1
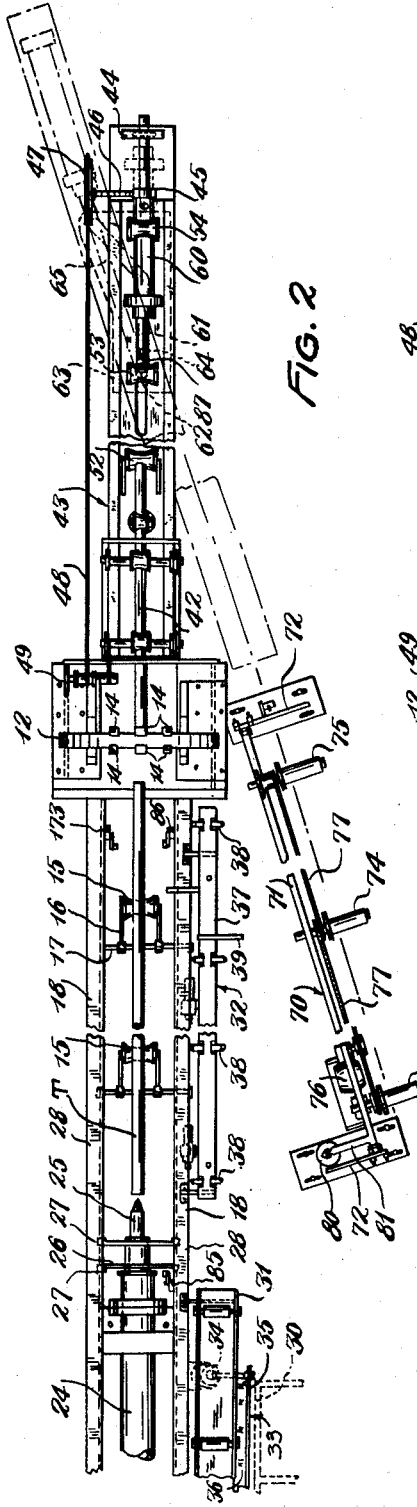
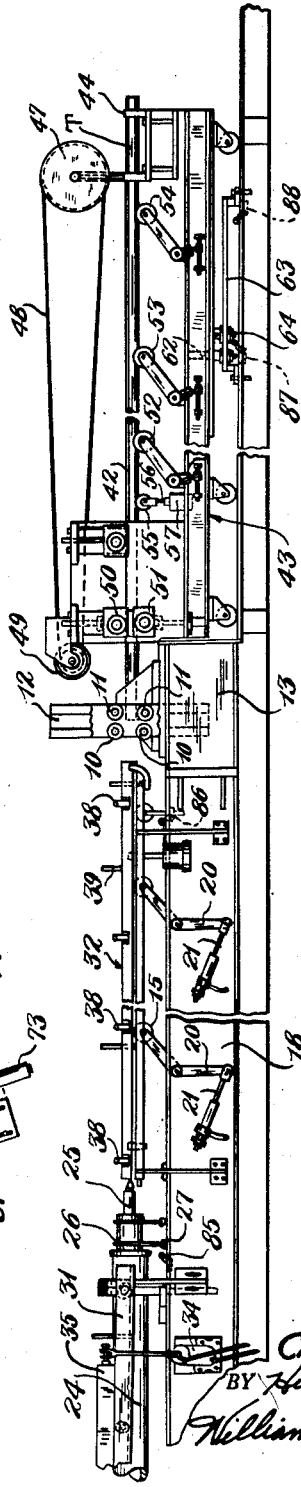
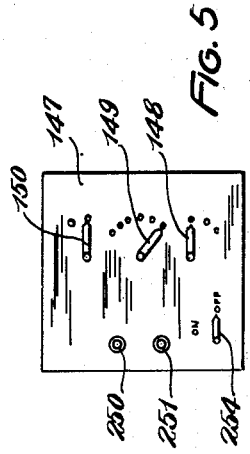
INVENTOR.
CHARLES G. WATSON
BY Hudson, Boughton,
Williams, David & Hoffman
ATTORNEYS

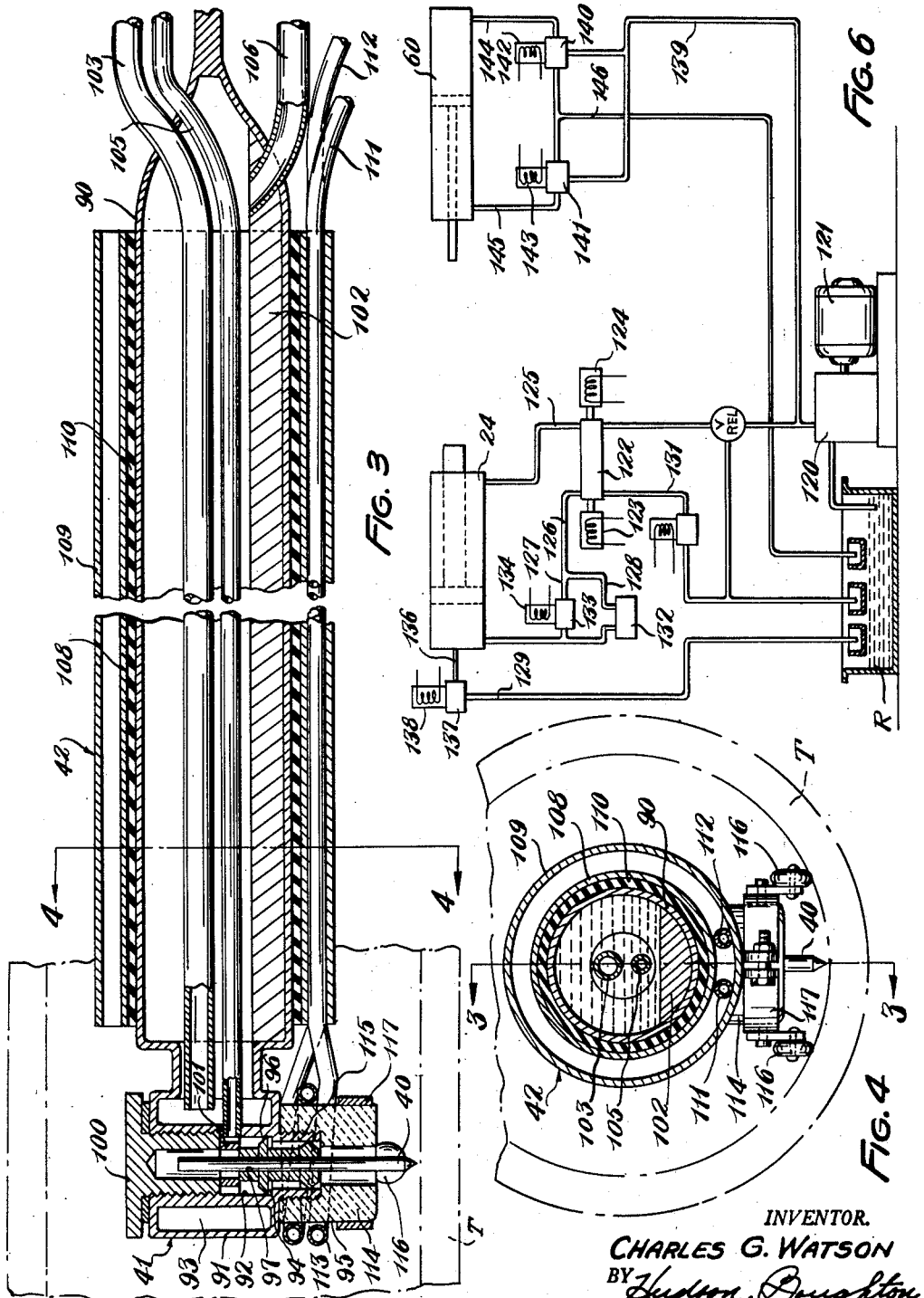

United States Patent Office 2,835,783
Patented May 20, 1958

2,835,783
TUBE WELDING MACHINE

Charles G. Watson, Youngstown, Ohio, assignor to The Youngstown Welding & Engineering Company, Youngstown, Ohio, a corporation of Ohio Application August 31, 1954, Serial No. 453,182

8 Claims. (Cl. 219—60)

The present invention relates to an apparatus for welding tubes and, more particularly, to an apparatus for welding tubes internally.

An important object of the present invention is the provision of a novel and improved apparatus for internally welding tubes including those of relatively small diameter, the apparatus being so constructed and arranged that long lengths of tubes may be welded rapidly and at a comparatively low cost.

Another object of the present invention is the provision of a novel and improved internal tube welding apparatus wherein the tube to be welded is telescoped over a welding head and a supporting structure therefor during the welding operation by a power feed, and is withdrawn from the welding head and supporting structure by power actuated means when the welding is completed.

Another object of the present invention is the provision of a novel and improved internal tube welding apparatus having a welding head and supporting structure therefor, power means for feeding a tube to be welded past the head and over the supporting structure, roller means for closing the tube prior to welding and for holding the tube after welding, and power means for removing the welded tube from the head and the supporting structure therefor.

Another object of the present invention is the provision of a novel and improved apparatus for welding tubes internally comprising a welding head and supporting structure therefor adapted to fit inside a tube to be welded, and a carriage for mounting the welding head and its support, the carriage being retractable from its position during the welding operation to permit the removal of the welded tube from the welding head and its support.

Another object of the present invention is the provision of a novel and improved welding apparatus comprising a welding head and an elongated tubular support for the head through which cooling water, inert gas, and electricity are supplied to the welding head, the head and support being so constructed and arranged that it will fit into relatively small tubes.

The invention resides in certain constructions and combinations and arrangements of parts, and further objects and advantages will be apparent to those skilled in the art to which it relates from the following description of the preferred embodiment described with reference to the accompanying drawings forming a part of this specification, in which:

Fig. 1 is an elevational view of a tube welding apparatus embodying the present invention and showing a welded tube in its position immediately after the welding operation;

Fig. 2 is a plan view of the apparatus shown in Fig. 1 with the welded tube of Fig. 1 shown in its position immediately before the welding operation;

Fig. 3 is a vertical, sectional view approximately on the line 3—3 of Fig. 4, through the welding head and the support therefor of the apparatus shown in Figs. 1 and 2;

Fig. 4 is a sectional view taken approximately along the line 4—4 of Fig. 3;

Fig. 5 is a view showing the control panel for the apparatus shown in Figs. 1 and 2;

Fig. 6 is a diagrammatic view of the hydraulic system of the apparatus shown in Figs. 1 and 2.

Figure 7:
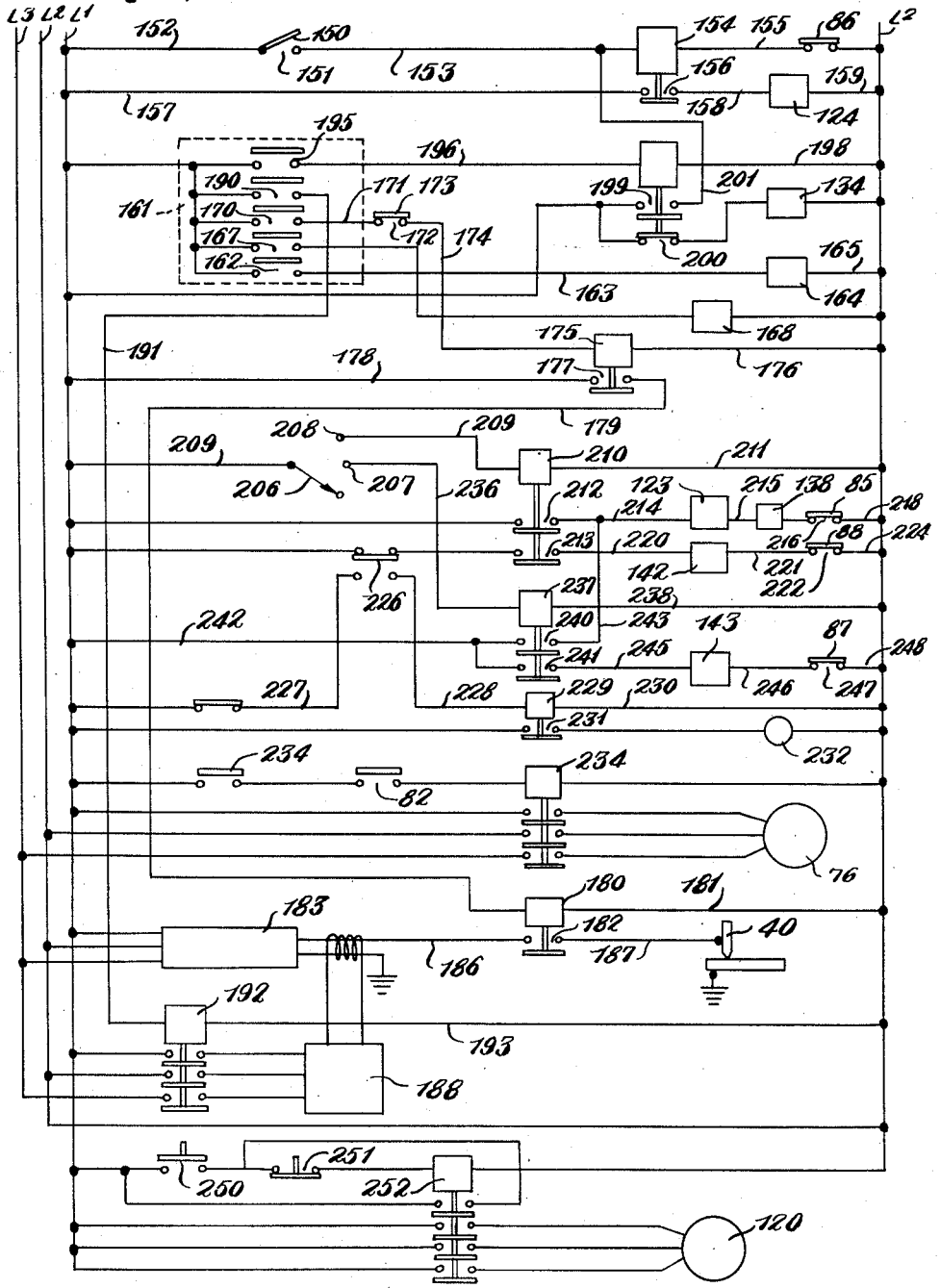
Fig. 7 is a circuit diagram of the electric control circuit of the apparatus shown in Figs. 1 and 2.

The present invention contemplates the provision of a novel and improved apparatus for welding internally the longitudinal seam of a tube. Referring to the drawings, the preferred form of an apparatus embodying the present invention comprises a set of closing rolls 10 and a set of holding rolls 11 mounted in a cylindrical frame 12 supported by a base 13. The individual closing and holding rolls lie in radial planes of the cylindrical frame 12, the rolls of each set being circumferentially spaced about a circle, with the sets defining aligned openings having a diameter equal to the desired outside diameter of the tube to be welded. Two rolls of each set are shown in Fig. 1. The rolls are adjustably supported in brackets 14 on the frame 12 to provide radial adjustability and permit the closing and welding of tubing of various diameters.

A tube T to be closed and welded is supported for lengthwise movement on rollers 15 so supported and arranged that the axis of the tube to be welded is aligned with the common axis of the openings defined by closing rolls 10 and holding rolls 11. Each roller 15 is journaled on a rod supported between parallel arms 16 which are fixed to a shaft 17 journally supported between spaced, parallel, longitudinal frame members 18. The height of each roller is adjustable by rotating its shaft 17. Suitable means is provided for rotating each shaft 17 and, in the illustrated embodiment, comprises a link 20 having one end connected to the shaft 17 and the other end connected to a rod 21 which is adjustably secured to one of the frame members 18 at a point spaced from the point of connection of the link 20 to the rod 21. By varying the distance between the point of connection of the link 20 to the rod 21 and the point of connection between the rod 21 and the frame member 18, the height of the corresponding roller 15 will be varied due to the rotation of the shaft 17.

The tube to be welded is moved lengthwise on the rollers 15 by power means comprising a hydraulic cylinder 24 mounted intermediate the frame members 18 and having a piston rod 25 adapted to engage the end of the tube to be welded. The piston rod 25 lies along the axis of the openings defined by closing rolls 10 and holding rolls 11. The forward end of the piston rod 25 is supported by a bracket 26 which straddles the frame members 18 and is provided with wheels 27 which roll on horizontal portions 28 of the frame members.

The tubes to be welded are supplied to the rollers 15 by means comprising a loading table 30, a gravity conveyor 31, and a tipping loader 32, the conveyor 31 and loader 32 being supported by the front frame member 18. The tubes are stacked on the loading table 30 which is inclined downwardly toward the conveyor 31 and are transferred from the table 30 to the conveyor 31 by means of an angle 33 which is rotated about its length by an air cylinder 34 from a first position where one of its legs 35 forms a continuation of the surface of table 30 and the other leg 36 extends generally vertically forming a stop to a second position 90 degrees therefrom where the leg 36 permits a tube in the angle 33 to roll onto the gravity conveyor 31 and the leg 35 extends vertically to prevent the tube from rolling off table 30. The gravity conveyor 31 is so inclined that a tube thereon will move endwise down the conveyor and onto the tipping loader 32. The tipping loader 32 comprises a bar 37 rotatably supported along the forward frame member 18 and having arms 38 forming spaced V's for receiving and holding a tube. A lever 39 is carried by the bar 37 for rotating the loader and rolling the tube onto the rollers 15. If so desired, power means may be provided for rotating the loader 32.

After the tube is positioned on the rollers 15, it is moved lengthwise through the closing rolls 10 and the holding rolls 11 by the hydraulic cylinder 24. A welding electrode 40, preferably of tungsten, is supported intermediate the closing rolls 10 and the holding rolls 11 by a welding head 41 mounted on one end of an elongated support structure 42 which extends along the axis of the openings defined by closing rolls 10 and holding rolls 11. The head and support structure is of a size which permits it to telescope into the tube to be welded.

The support structure 42 is supported by a movable carriage 43 so that it may be retracted away from the rolls 10 and 11, and is rotatably secured to the carriage 43 by a bracket 44 at the end of the structure remote from the welding electrode 40. The length of the structure 42 is such to accommodate the full length of the welded tube. The support structure 42 may be rotated to facilitate the proper positioning of electrode 40 by means of a worm wheel 45 secured to the support structure 42 and a worm 46 mounted on the carriage adjacent the right-hand end thereof as the carriage is viewed in Fig. 1. The worm 46 may be rotated by the rotation of a wheel 47 which is mounted above the worm 46 and operatively connected thereto. The wheel 47 is encompassed by a cable 48 which also extends around a wheel 49 mounted at the left-hand end of the carriage 43. It will be seen that the cable 48 provides a means for rotating the wheel 47 from a position adjacent the holding rolls 11.

As the welded tube passes onto the carriage 43 and telescopes over the support structure 42, it passes intermediate opposed rollers 50, 51 adjustably mounted at the left-hand end of carriage 43 and as it continues to move onto the carriage 43, it is supported by longitudinally spaced rollers 52, 53, 54. The rollers 52, 53, 54 are supported by means similar to the support means for rollers 15, thereby enabling the height of the rollers to be adjusted. Other supporting rollers may be provided, as desired.

The support structure is also supported by an auxiliary movable support member 55 carried on one end of a rod 56 adapted to be moved vertically by a solenoid 57. When a tube is being welded, the solenoid is energized to lower the member 55 and permit the passage of the tube intermediate the member 55 and the support structure 42.

After the tube has been welded and telescoped onto the support structure 42, the carriage 43 is retracted and swung to one side to permit the removal of the welded tube from the welding head 41 and support structure 42. A hydraulic cylinder 60 supported by the carriage 43 and having its ram 61 connected to a post 62 supported in a fixed position by the base of the machine provides the power means for moving the carriage 43. As fluid pressure is supplied to the cylinder 60 to move the ram outwardly, the carriage is moved away from the base 13 and its movement guided to swing the welded tube clear of the apparatus, as illustrated in Fig. 2, by a cam plate 63 fixedly mounted under the carriage 43. A post 64 fixed to the underside of carriage 43 is provided with a cam follower which operates in a cam groove 65 in the cam plate 63.

When the carriage 43 is in its retracted position, the elongated support structure 42 is in line with a power-driven unloader 70 comprising a horizontal bar 71 rotatably secured by the spaced uprights 72 and extending in line with the retracted elongated support structure 42.

The bar 71 journally supports rollers 73, 74, 75, which extend horizontally therefrom and are adapted to receive a tube from the carriage 43. The rollers 73, 74, 75 are power-driven by a motor 76 carried by the frame of the unloader and operatively connected to roller 73 and by chain drives 77 interconnecting the rollers 73, 74, 75. The bar 71 may be rotated from a position where the rollers 73, 74, 75 are generally horizontal, to a position where the rollers are inclined with respect to the horizontal by an air cylinder 80 having its position connected to one end of an arm 81 extending generally horizontally and perpendicularly to the bar 71.

The rollers 50, 51 on the carriage 43 are power-driven by any suitable means, such as an electric motor mounted on the carriage 43, and when a tube is to be transferred from the carriage 43 to the unloader 70, they are rotated in the direction necessary to move the tube from the carriage 43 toward the unloader 70. As the tube moves off the support structure 42 and onto the unloader 70, it will strike a limit switch 82 located on the forward end of the unloader to energize the motor 76 and drive the rollers of the unloader. After the tube has moved onto the unloader, the unloader is tilted by the air cylinder 80 to allow the tube to roll therefrom into a receiving bin or the like.

In addition to the limit switch 82, additional limit switches as required are provided to control the movements of the piston rod 25 and the carriage 43. Limit switches 85, 86 control the extent of the movement of the piston rod 25, the switches being mounted adjacent opposite ends of the horizontal portion 28 of the frame members 18 and actuated by engagement with the wheels 27 on the bracket 26.

The extent of the movement of the carriage 43 by the hydraulic cylinder 60 is governed by limit switches 87, 88 located adjacent opposite ends of the cam groove 65. The switch 88 has a pair of normally closed contacts and a pair of normally open back contacts for reasons hereinafter set forth.

According to one feature of the present invention, the welding head 41 and its support structure 42 is so constructed and arranged that it readily telescopes into the tube being welded. The support structure 42 comprises a tube 90 formed of electrically conductive material, preferably copper. The welding head 41 comprises an annular member 91 having an axial opening 92 and an annular cooling chamber 93 about the opening 92 which communicates with the interior of the tube 90. The axis of the opening 92 is perpendicular to the axis of the tube 90. The annular member 91 is formed with a shoulder 94 at the lower end of the opening 92 adapted to support a holder 95 for the electrode 40. The holder 95 is provided with a peripheral flange 96 adapted to rest on the shoulder 94 and is provided with an axial opening 97 to receive the electrode 40. The holder 95 is held against the shoulder 94 by means of a plug 100 which threads into the upper end of the opening 92 and engages a spacer ring 101 located intermediate the holder 95 and the plug.

During the welding operation one side of the welding electric power supply is connected to the tube 90, and the other side is grounded to the frame of the machine and the tube being welded. The tube 90 serves as the lead-in conductor to the electrode 40 and is preferably provided with a copper bar 102 extending substantially the length thereof to lower the resistance of the tube. Electrical connection from the tube 90 to the electrode 40 is made by the annular member 91 and the holder 95.

The welding head 41 is cooled during the welding operation by cooling fluid supplied through a tube 103 which passes through the tube 90 and terminates in the cooling chamber 93. The cooling fluid circulates around the cooling chamber 93 and is returned to the pump supplying the fluid, not shown in the drawings, by a conduit 106 which opens into the tube 90 at its end remote from the welding head 41. It will be seen that both the interior of the tube 90 and the cooling chamber 93 will be flooded during the welding operation.

A gas, such as helium, for shielding the welding arc and the weld is supplied through a duct 105 which passes longitudinally through the interior of the tube 90 and through the annular member 91 to communicate with the axial opening 92. The flow of the shielding gas is through the duct 105 into the axial opening 92, past the holder 95, and out the lower end of the opening 92 to shield the welding arc and the weld.

The tube 90 is telescoped inside a pair of coaxial tubes 108, 109 extending substantially the length of the tube 90, and is separated therefrom by a layer of insulating material 110. The tubes 108, 109 and insulating material 110 guard against short circuits caused by operators or conductive objects coming into contact with the tube 90. The tubes 108, 109 are spaced from each other to provide a support means for supply and return lines 111, 112 to a cooling coil 113 which encompasses the lower portion of the electrode 40. The supply and return lines 111, 112 are located intermediate tubes 108, 109. The cooling coil 113 is prevented from contacting the electrode 40 and the annular member 91 by a ceramic insulator 114 threaded onto a depending circle flange 115 having its axis lying along the axis of the opening 92.

The welding head 41 is supported during the welding operation by a pair of wheels 116 supported by a band 117 encircling the insulator 114. The wheels 116 are adapted to roll on the interior side wall of the tube being welded.

It may now be seen that a welding head and support structure constructed as above described may be of such dimensions as to readily telescope into tubes of relatively small diameters. The enlarged view of the welding head and support structure shown in Fig. 3 does not illustrate the means for supporting the right-hand end of the support structure on the carriage 43. It will be understood, however, that the outer tube 109 of the coaxial tubes 108, 109 is secured in the bracket 44 and mounts the worm wheel 45 for rotating the welding head.

The hydraulic system for feeding the tube and for controlling the movement of the carriage 43 is illustrated schematically in Fig. 6, and the electrical control circuit for the apparatus is shown schematically in Fig. 5. As may be seen from Fig. 6, the hydraulic system includes a pump 120 driven by a motor 121 for supplying fluid to the system. The fluid from the pump for operating the hydraulic cylinder 24 passes through a four-way control valve 122 controlled by solenoids 123, 124.

When the solenoid 123 is energized, the discharge of the pump is connected to the right side of the piston of cylinder 24 by a pipe line 125 extending from the valve 122 to the cylinder. Fluid pressure applied to the right side of the piston causes the return movement of the piston. When the coil 124 is energized, the valve 122 is in such a position that the discharge of the pump 120 is directed to the left or feed side of the piston of cylinder 124 through a pipe line 126, parallel connected pipe lines 127, 128, and inlet pipe line 129 to the cylinder to cause the feed movement of the cylinder. When the valve 122 is in position to direct the discharge of the pump 120 into line 126, it also connects the line 125 to the return side of the piston to a drainline 131 which leads to a reservoir R for pump 120.

The parallel pipe lines 127, 128 in the supply to the feed side of the piston of cylinder 24 provide a means for moving the main piston at a rapid traverse rate and at a feed rate. Line 128 includes a flow-restricting device or orifice 132 and line 127 includes a solenoid valve 133 having an actuating solenoid 134. When the solenoid 134 is energized, the valve 133 is open and the flow of fluid through the line 127 is unrestricted. When the solenoid 134 is de-energized, the valve 133 closes and forces all fluid to flow through the orifice 132, causing the main piston to move at a feed rate.

When the main piston is to be returned, the solenoid 123 is energized and pressure is applied to the right-hand side of the piston through line 125, the line 126 being closed by the valve 122. In order to provide a drain connection for the left-hand side of the main piston, a line 136 is provided between the left-hand side of the piston and the reservoir R. The line 136 includes a solenoid valve 137 operated by a solenoid 138 which is energized when it is desired to connect the left-hand side of the main piston to the reservoir.

A pipe line 139 is connected to the discharge of pump 120 for supplying fluid pressure to the cylinder 60 and moving the carriage 43. The line 139 is connected to the inlet port of a three-way valve 140 and to the inlet port of a three-way valve 141 operated by solenoids 142, 143 respectively. An outlet port of valve 140 is connected to the right-hand side of the piston of the cylinder 60 by a pipe line 144 so that when pressure is supplied to the cylinder 60 through the line 144, the carriage is moved to its position to receive a tube being closed and welded by the apparatus.

An outlet port of valve 141 is connected to the left-hand side of the piston of cylinder 60 by a pipe line 145 so that when fluid is supplied to cylinder 60 through line 145, the carriage 43 is moved away from the closing and holding rolls to its unloading position.

When the solenoids 142, 143 are energized, the valves 140, 141 are moved to a position permitting the flow of fluid through the valves from the line 139. When the solenoids are deenergized, the valves 140, 141 block the flow of fluid from the line 139 and connect the lines 144, 145 respectively to a drainline 146 leading to the reservoir R for the pump.

The main operations of the tube welder are controlled from a control panel 147 including switch levers 148, 149, 150. The lever 150 controls the rapid traverse feed movement of the piston of cylinder 24. As may be seen from Fig. 7, moving the lever 150 closes normally open contacts 151 to complete a circuit from L1 of a three-phase power supply through wire 152, now closed contacts 151, wire 153, the solenoid coil of a relay 154, wire 155, and normally closed contacts of limit switch 86 to L2. The relay 154 has a pair of normally open contacts 156, and energization of the relay completes a circuit from L1 through wire 157, now closed contact 156 of relay 154, wire 158, solenoid 124 of valve 122, and wire 159, to L2. Energization of solenoid 124 moves the valve 122 so that pressure is supplied to the left-hand side of the piston of cylinder 24 through lines 126, 127 and 129. The passage of the fluid through line 127 is unrestricted since the coil 134 of the solenoid valve 133 is normally energized.

When a tube to be welded has been moved up to the closing rolls by the operation of lever 150, the switch is returned to its normal position opening contact 151. The feed movement and the welding operation are now controlled by the operation of lever 149 which controls switch means 161. The lever 149 is movable from a neutral position to and through five positions, and actuates a microswitch as it is moved to each position. Upon actuation by the lever 149, each microswitch remains in a closed position until the lever is returned to the neutral position side of the position for actuating the microswitch. When the lever 149 is moved to its first position, a normally open microswitch 162 is closed completing a circiut from L1 through the now closed contacts of the switch 162, the wire 163, a solenoid 164, and a wire 165 to L2. Energization of the solenoid 164 operates a solenoid valve to supply gas to the welding head 41 through the tube 105.

Movement of the lever 149 to its second position closes the normally open contacts of a microswitch 167, completing a circuit from L1 through a solenoid 168 to L2.

Energization of solenoid 168 lowers the support member 55 to permit the passage of the welded tube over the elongated structure 42.

Movement of the lever 149 to its third position closes the normally open contacts of microswitch 170 to complete a circuit from L1 through the now closed contacts of microswitch 170, wire 171, normally closed contacts 172 of a switch 173, wire 174, a solenoid of a relay 175, and wire 176, to L2. The relay 175 has normally open contacts 177 which are colsed upon the energization of the relay, completing a circuit from L1 through wire 178, now closed contacts 177, wire 179, the solenoid of a relay 180, and wire 181, to L2. The relay 180 is provided with a pair of normally open contacts 182, and the energization of the relay completes a circuit for supplying power to the welding electrode from a welding power supply 183. One side of the welding power supply 183 is grounded to the frame of the machine and the tube to be welded, while the other side of the power supply is connected to the electrode 40 through a wire 186, now closed contacts 182 of relay 180 and wire 187.

The arc between the welding electrode 40 and the tube to be welded is preferably started by a high frequency induction unit 188 inductively coupled into the arc circuit of the electrode 40 as will be understood by those skilled in the art. The high frequency induction unit 188 is started by moving the lever 149 to its fourth position, which closes the normally open contacts of a microswitch 190, completing a circuit from L2 through the now closed contacts of the microswitch 190, wire 191, the solenoid of a contactor 192, and wire 193, to L2. Energization of the contactor 192 closes its normally open contacts, completing a circuit from the three-phase power supply to the high frequency induction unit.

Movement of the lever 151 to its fifth position closes the normally open contacts of a microswitch 195, completing a circuit from L1 through the now closed contacts of microswitch 195, wire 196, the solenoid of a relay 197, and wire 198, to L2. The relay 197 is provided with a set of normally open contacts 199 and a set of normally closed contacts 200. The energization of relay 197 closes the contacts 199, completing a circuit from L1 through the now closed contacts 199 of relay 197, wire 201, wire 153, relay 154, wire 155, and normally closed contacts of limit switch 86 to L2. Energization of the relay 154 moves the valve 122 in the manner above described to connect the discharge of the pump 120 to the line 126 to supply fluid to the feed side of the piston of cylinder 24. The piston, however, is moved at a feed rate since the energization of relay 197 also opens its normally closed contacts 200 connected into the circuit for energizing solenoid 134 of solenoid valve 133. The de-energization of solenoid 134 closes the valve 133, causing the fluid to flow through the orifice 132 to reach the inlet line 129 and the cylinder 24. The feed movement is automatically stopped by actuation of limit switch 82 de-energizing relay 51 and solenoid 124 of valve 122.

The piston of the cylinder 24 is returned and the carriage 43 retracted by operating lever 148 which moves a switch arm 206 from an open position to a position where it engages a contact 207, or to a position where it engages a contact 208. The switch arm 206 is connected by a wire 209 to L1. To return the piston of the cylinder 24 and to retract the carriage 43, the switch arm 206 is moved by lever 148 from its open position to a position where it engages contact 208. This completes a circuit from L1 through wire 209, switch arm 206, contact 208, wire 209, a relay 210, and a wire 211 to L2. Relay 210 is provided with normally open contacts 212, 213. The closing of contacts 212 completes a circuit from L1 through the now closed contacts 212 of relay 210, wire 214, solenoid 123 of valve 122, wire 215, solenoid 138 of solenoid valve 137, contacts 216 of the normally closed limit switch 87, and wire 218 to L2. The energization of solenoids 123, 138 connects the discharge from the pump 120 to the right-hand side of the main piston of cylinder 24 to return the piston and opens the cylinder on the left-hand side of the piston to the reservoir R. The return movement is automatically stopped by the operation of limit switch 85 to open its contacts 216 and de-energize solenoid 123.

The energization of relay 210 also closes its normally open contacts 213, completing a circuit from L1 through the now closed contacts 213, wire 220, solenoid 142 of valve 143, wire 221, contacts 222 of the normally closed limit switch 88, and wire 224 to L2. The energization of solenoid 142 connects the discharge of the pump 120 to the right-hand side of the piston of cylinder 60, causing the carriage to retract and swing outwardly to a position in line with the unloader 70. The retraction of the unloader 70 is stopped by the actuation of limit switch 88, which opens the contacts 222 and de-energizes the solenoid 142.

The opening of the limit switch 88 closes its normally open back contacts 226 completing a circuit from L1 through wire 227, now closed contacts 226, wire 228, relay 229, and wire 230 to L2. The energization of relay 229 closes normally open contacts 231 and completes a circuit to a motor 232, not shown on the machine, for driving the rolls 50, 51 to remove the tube from the carriage 43. The circuit to relay 229 preferably includes a normally open limit switch 233 which is closed by the tube as it passes from the holding rolls 11 onto the elongated support 42. This switch will open after the tube is removed from the elongated support structure 42 stopping the motor 232.

As the tube moves from the elongated support structure 42 of the carriage 43 onto the unloader 70, it closes the limit switch 82 at the forward end of the unloader. The closing of limit switch 82 completes a circuit to a contactor 234, which, when energized, connects motor 76 on the unloader to the three-phase power supply, causing it to drive the rollers 73, 74, 75 to pull the tube onto the unloader.

After the tube has been removed from the unloader, the carriage is moved back to its position in line with the holding and closing rolls of the apparatus by moving the switch arm 206 so that it makes contact with the contact 207. This completes a circuit from L1 through wire 209, switch arm 206, contact 207, wire 236, relay 237 and wire 238 to L2. The energization of relay 237 closes its normally open contacts 240, 241. The closing of the normally open contacts 240 completes a circuit from L1 through wire 242, now closed contacts 240, wire 243, wire 214, solenoid 123, wire 215, solenoid 138, contacts 216 of normally closed limit switch 85, and wire 218 to L2. This last-described circuit keeps the solenoids 123, 138 for returning the main feed piston energized so that the completion of the removal of the tube from the carriage 43 and the movement of switch arm 206 to engage contact 207 will not stop the return of the main feed piston unless the limit switch 85 has been actuated.

The closing of the normally open contacts 241 of relay 237 when the switch arm is moved to engage contact 207 completes a circuit from L1 through wire 242, now closed contacts 241 of relay 237, wire 245, solenoid 143, wire 246, contacts 247 of normally closed limit switch 87 and wire 248 to L2. The energization of solenoid 143 supplies fluid to the left side of the piston of cylinder 60 causing the carriage to return to its position for receiving a tube from rolls 10, 11. The return movement of the carriage is stopped by actuation of the limit switch 87 which breaks the circuit to solenoid 143 and closes valve 141.

The control panel 146 may include other switches necessary for controlling the various elements of the tube welder. A switch 250 and a switch 251, both of the push button type, are provided to start and stop the motor 121 for driving the pump 120. Depressing the push button switch 250 closes its normally open contacts to complete a circuit to a relay 252. The energization of relay 252 closes its normally open contacts, connecting the motor 120 to the three-phase power supply and completing a holding circuit around switch 250 to maintain the relay 252 energized upon release of the push button 250. The motor is stopped by depressing the push button switch 251 connected in series with the push button 250 and the relay 252.

The welding arc may be stopped at any time by the opening of switch 173 connected in series with the relay 175 for controlling the operation of relay 180 for connecting the power to the welding electrode 40. The switch 173 may be located on the rear frame member 18 so that it is operated by the bracket 26 at the same time the bracket actuates limit switch 86, providing an automatic cut-off for the welding arc. In this location the switch 173 may also be actuated by the operator if he desires to stop the arc at any time prior to the actuation of the switch 173 by the bracket 26. A switch 254 may also be located on the control panel 146 for opening the circuit to the welding electrode 40. This switch has not been included in the electrical diagram, but it may be located in the wire 86 between the welding power supply 183 and the contacts 182.

It is believed that the operation of the tube welder is readily apparent from the above description. The tubes to be welded are stacked on the table 30 and are transferred one at a time from the table 30 to the gravity conveyor 31 by the transfer mechanism operated by air cylinder 34. The tube, upon being transferred to the gravity conveyor 31, rolls endwise down the conveyor to the tipping loader 32 which is operated to transfer the tubes onto the rollers 15. After the tube is on the rollers 15, the hydraulic cylinder 24 is subjected to fluid pressure to move the piston rod 25 into engagement with the end of the tube and to move the tube toward the closing rolls at a rapid traverse rate. When the tube approaches the closing rolls 10, the rate of movement of the tube is changed to a feed rate, power is supplied to the welding electrode 40, and gas is supplied to the welding head 41 to shield the arc and the welder. As the tube passes through the rolls 10, the longitudinal seam to be welded is closed and then welded by the electrode 40 located intermediate the closing rolls 10 and holding rolls 11. After the weld has been made, the holding rolls 11 exert pressure to maintain the tube in its closed position, giving the weld time to cool.

As the tube is welded, it passes over the welding head 41 and telescopes onto the elongated support structure 42 for the head. After completion of the weld, the carriage 43 is retracted by the hydraulic cylinder 60 and swung into a position in line with the unloader 70. When in line with the unloader 70, power-driven rolls are actuated on the carriage 43 to start removing the tube from the elongated support structure 42. As the tube moves from the support structure 42 onto the unloader 70, it actuates a limit switch which starts the operation of power-driven rollers 73, 74, 75 to assist in the removal of the tube. After the tube has been transferred to the unloader 70, the unloader is tilted to drop the tube into a storage bin or the like.

The tube welder as described utilizes a tungsten electrode with a shielding gas such as helium. It will be understood by those skilled in the art that the apparatus is readily adaptable for use with other types of welding electrodes and other methods of welding.

While a preferred form of the invention has been described in considerable detail, it will be apparent that the invention is not limited to the construction shown or the uses referred to, and it is my intention to cover hereby all adaptations, modifications and changes which come within the practice of those skilled in the art to which the invention relates and the scope of the appended claims.

Having thus described my invention, I claim:

1. In an apparatus for welding a tube, an elongated welding head support member of a size to fit within the tube to be welded and of a length as great as the length of the tube portion to be operated upon, means for axially advancing the tube to be welded along a path to telescope the tube about said support member from one end thereof, a welding head connected to said one end of said support member for welding said tube, and means connected to the other end of said support member for mounting the latter and for supporting the latter and the tube telescoped thereover for swinging movement to a discharge position defining an angle with said path.

2. In an apparatus for welding a tube, an elongated welding head support member of a size to fit within the tube to be welded and of a length as great as the length of the tube portion to be operated upon, means for axially advancing the tube to be welded along a path to telescope the tube about said support member from one end thereof, means adjacent said one end for closing a seam in said tube, a welding head connected to said one end of said support member for welding the closed seam of said tube, and means connected to the other end of said support member for mounting the latter and for supporting the latter and the tube telescoped thereover for swinging movement as a unit to a discharge position defining an angle with said path.

3. In an apparatus for welding a tube, an elongated welding head support member of a size to fit within the tube to be welded and of a length as great as the length of the tube portion to be operated upon, means for axially advancing between the tube to be welded and the support member along a path to telescope the tube over said support member from one end thereof, a welding head connected to said one end of said support member for welding a seam of said tube, and means connected to the other end of said support member for mounting the latter and for supporting the latter and the tube telescoped thereover for swinging movement to a discharge position defining an angle with said path, the last said means including power actuated means for discharging the welded tube.

4. In an apparatus for welding a tube, an elongated welding head support member of a size to fit within the tube to be welded and of a length as great as the length of the tube portion to be operated upon, means for axially advancing the tube to be welded along a path to telescope the tube about said support member from one end thereof, a welding head connected to said one end of said support member for welding said tube, and means connected to the other end of said support member for mounting the latter and for supporting the latter and the tube telescoped thereover for swinging movement to a discharge position defining an angle with said path and including power-actuated means for swinging said support member to said discharge position.

5. In an apparatus for welding a tube, an elongated welding head support member of a size to fit within the tube to be welded and of a length as great as the length of the tube portion to be operated upon, means for axially advancing the tube to be welded along a path to telescope the tube about said support member from one end thereof, a welding head connected to said one end of said support member for welding said tube, means connected to the other end of said support member for mounting the latter and for supporting the latter and the tube telescoped thereover for swinging movement to a discharge position defining an angle with said path including power-atcuated means for swinging said support member to said discharge position, and including power actuated means for discharging the welded tube at said discharge position.

6. In a welding apparatus for welding a tube, an elongated welding head support member of a size to fit within the tube to be welded and of a length as great as the portion of the tube to be operated upon, a welding head connected to one end of said support member, feed means for axially advancing the tube to be welded over said support member in a telescopic relationship from said one end of the support member, mounting means connected to the other end of said support member and supporting the latter and the tube telescoped thereover for movement between a first position for receiving the tube from said feed means and a discharge position angularly related to the first position, stationary closing means disposed adjacent said one end of said support member when the latter is in said first position for closing a seam in the tube as the tube is advanced over said support member, and means carried by said support member for supplying shielding gas, cooling fluid and electric power to said welding head.

7. In a welding apparatus for welding a tube, an elongated welding head support member of a size to fit within the tube to be welded and of a length as great as the portion of the tube to be operated upon, mounting means connected to one end of said support member supporting the latter for movement between a first position and a second position angularly related to the first position, a welding head connected to the other end of said support member, means for axially advancing the tube to be welded over said support member in a telescoping manner from said other end of the support member when the latter is in said first position, stationary closing means disposed adjacent said other end of said support member when the latter is in said first position for closing a seam in the tube as the tube is advanced onto said support member, and means carried by said support member for supplying shielding gas, cooling fluid and electric power to said welding head, said mounting means comprising a carriage movable in a direction away from said closing means to swing said support member with the tube telescoped thereover to said second position and power-actuated means for moving said carriage.

8. In a welding apparatus for welding a tube, an elongated support member of a size to fit within the tube to be welded and of a length as great as the portion of the tube to be operated upon, mounting means connected to one end of said support member supporting the latter for movement between a first position and a second position angularly related to the first position, a welding head connected to the other end of said support member, means for axially advancing the tube to be welded onto said support member when the latter is in said first position from said other end of the support member, stationary closing means disposed adjacent said other end of said support member when the latter is in said first position for closing a seam in the tube as the tube as advanced onto said support member, and means carried by said support member for supplying shielding gas, cooling fluid and electric power to said welding head, said mounting means comprising a carriage movable in a direction away from said closing means to swing said support member to said second position, power-actuated means for moving said carriage, and power-actuated means on said carriage for removing the tube from said support member.

References Cited in the file of this patent

UNITED STATES PATENTS

| | | | |
|---|---|---|---|
| 1,679,499 | Rupley | Aug. 7, | 1928 |
| 1,914,518 | Martin | June 20, | 1933 |
| 1,946,302 | Weller | Feb. 6, | 1934 |
| 1,972,029 | Norquist | Aug. 28, | 1934 |
| 2,260,260 | Mikesh | Oct. 21, | 1941 |
| 2,468,808 | Drake | May 3, | 1949 |
| 2,544,711 | Mikhalapov | Mar. 13, | 1951 |
| 2,547,872 | Kissick | Apr. 3, | 1951 |
| 2,695,942 | Darner | Nov. 30, | 1954 |